United States Patent
Ko et al.

(10) Patent No.: US 6,771,892 B2
(45) Date of Patent: *Aug. 3, 2004

(54) STORAGE MEDIUM STORING CATALOG INFORMATION AND AUDIO INFORMATION

(75) Inventors: Jung-wan Ko, Yongin (KR); Jung-kwon Heo, Seoul (KR); Jae-hoon Heo, Suwon (KR); Jung-seuk Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 304 days.

This patent is subject to a terminal disclaimer.

(21) Appl. No.: 09/923,400

(22) Filed: Aug. 8, 2001

(65) Prior Publication Data

US 2001/0046376 A1 Nov. 29, 2001

Related U.S. Application Data

(62) Division of application No. 09/263,816, filed on Mar. 8, 1999.

(30) Foreign Application Priority Data

Mar. 6, 1998 (KR) .............................. 98-7525

(51) Int. Cl.[7] .............................. H04N 7/04; H04N 7/06; H04N 7/08; H04N 7/52; H04N 5/781; H04N 5/85; H04N 5/90; H04N 5/91
(52) U.S. Cl. .......................... 386/96; 586/125; 586/126
(58) Field of Search ...................... 366/39, 45, 95–106, 366/125–126

(56) References Cited

U.S. PATENT DOCUMENTS

| 5,131,311 | A | * | 7/1992 | Murakami et al. ...... 434/307 A |
| 5,617,385 | A | | 4/1997 | Lee et al. |
| 5,654,516 | A | * | 8/1997 | Tashiro et al. ................. 84/601 |
| 5,687,160 | A | * | 11/1997 | Aotake et al. ............ 369/275.3 |
| 5,703,308 | A | | 12/1997 | Tashiro et al. |
| 5,734,788 | A | | 3/1998 | Nonomura et al. |
| 5,778,142 | A | | 7/1998 | Taira et al. |
| 5,863,206 | A | * | 1/1999 | Narusawa et al. ...... 434/307 A |
| 5,889,746 | A | * | 3/1999 | Moriyama et al. ........ 369/30.03 |
| 5,895,124 | A | * | 4/1999 | Tsuga et al. ................. 386/98 |

(List continued on next page.)

FOREIGN PATENT DOCUMENTS

| EP | 0 465 246 A2 | 1/1992 |
| EP | 0 718 845 A2 | 6/1996 |
| EP | 0 738 999 A2 | 10/1996 |
| JP | 4-67490 | 3/1992 |
| JP | 8-227577 | 9/1996 |
| JP | 8-339194 | 12/1996 |

OTHER PUBLICATIONS

U.S. patent application Ser. No. 09/263,816, Jung–wan Ko et al., filed Mar. 8, 1999.

(List continued on next page.)

Primary Examiner—Thai Tran
Assistant Examiner—Polin Chieu
(74) Attorney, Agent, or Firm—Staas & Halsey, LLP

(57) ABSTRACT

A storage medium which stores catalog information and a catalog information playback apparatus and method therefor. Using the method, catalog information including a still picture and additional information together with audio data are recorded on a storage medium such as a digital versatile disk (DVD), which is an optical record storage medium, and the catalog information is played back during playback of the audio data, to thereby provide various information on the audio data. Also, the apparatus includes a buffer memory for catalog playback which maintains a predetermined standard and compatibility, and is capable of real-time reading during playback of the audio data, and automatically plays back the catalog content, corresponding to the playback state of the audio data, when there is no additional selection of a user.

16 Claims, 3 Drawing Sheets

U.S. PATENT DOCUMENTS

| | | | |
|---|---|---|---|
| 5,963,704 A | | 10/1999 | Mimura et al. |
| 6,067,282 A | | 5/2000 | Moriyama et al. |
| 6,125,232 A | | 9/2000 | Taira et al. |
| 6,198,877 B1 | | 3/2001 | Kawamura et al. |
| 6,208,802 B1 | * | 3/2001 | Mori et al. ............... 386/96 |
| 6,219,488 B1 | | 4/2001 | Mori et al. |
| 6,222,983 B1 | * | 4/2001 | Heo ....................... 386/96 |
| 6,272,082 B1 | | 8/2001 | Ishii et al. |
| 6,283,764 B2 | * | 9/2001 | Kajiyama et al. ....... 434/307 A |
| 6,289,166 B1 | | 9/2001 | Uno et al. |
| 6,381,403 B1 | * | 4/2002 | Tanaka et al. ............ 386/106 |
| 6,385,387 B1 | * | 5/2002 | Tanaka et al. ............ 386/94 |
| 6,392,969 B1 | | 5/2002 | Heo |
| 6,449,227 B1 | | 9/2002 | Heo |
| 6,678,467 B2 | * | 1/2004 | Ko et al. ................. 386/96 |
| 6,687,455 B1 | * | 2/2004 | Ko et al. ................. 386/96 |

OTHER PUBLICATIONS

U.S. patent application Ser. No. 09/583,877, Jung–wan Ko et al., filed May 31, 2000.

U.S. patent application Ser. No. 09/923,322, Jung–wan Ko et al., filed Aug. 8, 2001.

U.S. patent application Ser. No. 09/923,323, Jung–wan Ko et al., filed Aug. 8, 2001.

U.S. patent application Ser. No. 09/924,094, Jung–wan Ko et al., filed Aug. 8, 2001.

U.S. patent application Ser. No. 09/923,361, Jung–wan Ko et al., filed Aug. 8, 2001.

U.S. patent application Ser. No. 09/583,876, Jung–wan Ko et al., filed May 31, 2000.

U.S. patent application Ser. No. 09/927,500, Jung–wan Ko et al., filed Aug. 13, 2001.

U.S. patent application Ser. No. 09/927,495, Jung–wan Ko et al., filed Aug. 13, 2001.

U.S. patent application Ser. No. 09/927,494, Jung–wan Ko et al., filed Aug. 13, 2001.

U.S. patent application Ser. No. 09/927,496, Jung–wan Ko et al., filed Aug. 13, 2001.

U.S. patent application Ser. No. 09/927,491, Jung–wan Ko et al., filed Aug. 13, 2001.

U.S. patent application Ser. No. 09/923,401, Jung–wan Ko et al., filed Aug. 8, 2001.

U.S. patent application Ser. No. 09/923,399, Jung–wan Ko et al., filed Aug. 8, 2001.

U.S. patent application Ser. No. 09/923,321, Jung–wan Ko et al., filed Aug. 8, 2001.

* cited by examiner

FIG. 2

| FILE ID | |
|---|---|
| CPGC # FOR ALL AUDIO TITLES | FILE POINTER FOR CATALOG AUTO PRESENTATION INFORMATION TABLE1 |
| CPGC # FOR AUDIO TITLE1 | FILE POINTER FOR CATALOG AUTO PRESENTATION INFORMATION TABLE2 |
| CPGC # FOR AUDIO TITLE2 | FILE POINTER FOR CATALOG AUTO PRESENTATION INFORMATION TABLE3 |
| ... | ... |
| CPGC # FOR AUDIO TITLEn | FILE POINTER FOR CATALOG AUTO PRESENTATION INFORMATION TABLEn+1 |

STORAGE MEDIUM STORING CATALOG INFORMATION AND AUDIO INFORMATION

CROSS-REFERENCE TO RELATED APPLICATIONS

This application claims the benefit of Korean Application No. 98-7525, filed Mar. 6, 1998, in the Korean Patent Office, the disclosure of which is incorporated herein by reference. This application is a divisional of U.S. Ser. No. 09/263,816, filed Mar. 8, 1999, now pending.

BACKGROUND OF THE INVENTION

1. Field of the Invention

The present invention relates to a field of optical recording and/or playback, and more particularly, to a storage medium storing audio data and catalog information related to the audio data and an apparatus and method for playing back catalog information.

2. Description of the Related Art

In an optical recording and/or playback apparatus in which a digital versatile disk (DVD) is used as a storage medium, a catalog function, and an apparatus or method for performing the catalog function has not been proposed.

Here, the contents of the audio include the record contents, the composer, the artist and/or performer, etc. Particularly, the catalog is additional data for illustrating the contents of the audio which is main data recorded on the storage medium, including such additional information as still pictures and captions as video information.

The catalog information which is played back in a playback apparatus having a video decoder, preferably, has an inspecting function for reading the desired contents of the catalog, without interfering with the playback of the audio.

It is also preferable that the catalog information can be easily manufactured using an established editing system for DVD-Video.

In order to satisfy the above-described conditions, two types of information, i.e., audio and catalog data, which perform different functions in a storage medium must be simultaneously played back. Thus, even when the audio data is played back at the maximum transmission speed of the playback apparatus, a predetermined amount of the catalog information must have already been played back and stored in a temporary storage, so that both the audio and the catalog contents can be simultaneously played back.

That is, when the storage medium, in which information for forming the catalog is stored, is inserted into a driver, a player or an editor, the catalog information stored in the storage medium is read and stored in a temporary storage, i.e., a memory, to be output in the form of an image if necessary. Here, in order to store the catalog information read from the storage medium, in the memory, the image size must be defined, and further a method for effectively using the memory must be provided.

It is also preferable that navigation information, which has been proposed in the DVD-Video, i.e., search information added to the catalog information such that a user can search an arbitrary catalog page, and a specification for processing the search information be provided. Further, an editing system manufacturing a catalog corresponding to the specification shares with an editing system according to the DVD-Video specification.

Here, the DVD-Read Only Memory (ROM) is a record medium defined by the physical specification of Part 1 of a DVD specification for a read-only disk produced by Toshiba Corporation and other companies (the DVD forum) in August, 1996 and the file system specification of Part 2 thereof. Also, the DVD-video means video edited by an image information recording method defined by the video specification of Part 3 thereof or a DVD-ROM disk in which the video is recorded.

SUMMARY OF THE INVENTION

It is an object of the present invention to provide a storage medium for storing catalog information to satisfy the above-described conditions.

It is another object of the present invention to provide a playback apparatus and method for reading desired catalog contents from catalog information related to audio data, while the audio data stored in a DVD disk is played back.

It is still another object of the present invention to provide an apparatus and method for automatically accessing the location of the catalog using real-time playback information extracted from audio data to be played back without a command to read the catalog in a predetermined location, while audio data stored in a DVD disk is played back.

Additional objects and advantages of the invention will be set forth in part in the description which follows and, in part, will be obvious from the description, or may be learned by practice of the invention.

Accordingly, to achieve the above and other objects of the present invention, there is provided a storage medium randomly accessible and storing audio data and catalog information which is related to the audio data and stored in a predetermined region of the storage medium.

The catalog information playback apparatus includes storing means storing audio data and catalog information from the storage medium in which audio data, catalog information formed of information related to the audio data, and catalog playback information connecting the audio data and the catalog information to each other during playback are stored, a video decoder providing an image restored by decoding the catalog information and additional information, an audio decoder providing audio signals restored by decoding the audio data, and a controller controlling playback of catalog information corresponding to a selection of a user and the catalog playback information.

The method for playing back data recorded on the storage medium storing audio data, catalog information related to the audio data, and catalog playback information connecting the audio data and the catalog information to each other during playback includes playing back the catalog information corresponding to the catalog playback information; and playing back the audio data corresponding to the played back catalog information.

BRIEF DESCRIPTION OF THE DRAWINGS

The above objectives and advantages of the present invention will become more apparent by describing in detail a preferred embodiment thereof with reference to the attached drawings, in which:

FIG. 2 is an example of a table showing catalog playback information for playing back catalog information according to the embodiment of the present invention.

DESCRIPTION OF THE PREFERRED EMBODIMENT

Figure 1:
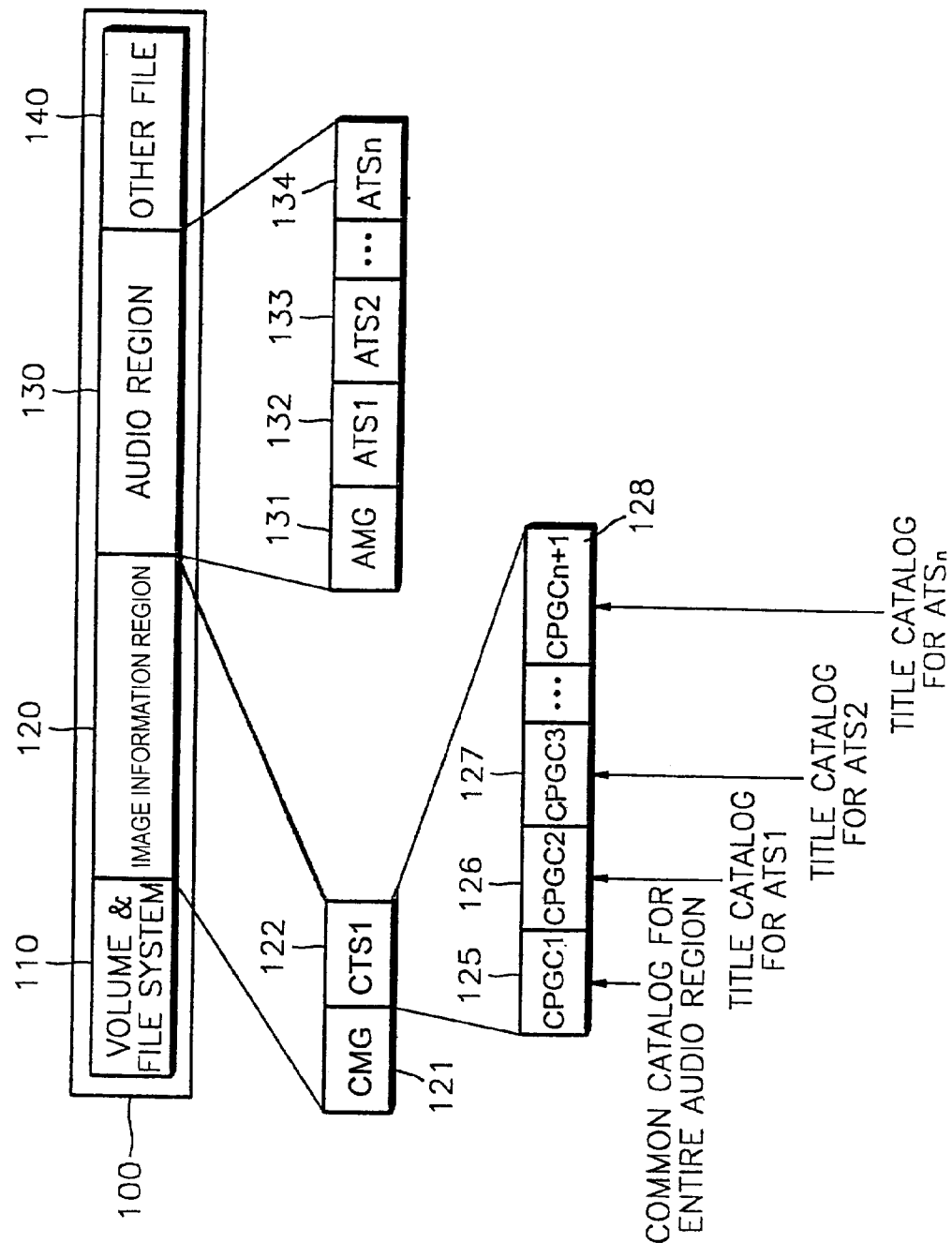
FIG. 1 shows a digital versatile disk (DVD)-read only memory (ROM) structure of one dimension according to an example of a storage medium storing catalog information according to an embodiment of the present invention.

Reference will now made in detail to the present preferred embodiment of the present invention, examples of which are illustrated in the accompanying drawings, wherein like reference numerals refer to the like elements throughout. The embodiment is described below in order to explain the present invention by referring to the figures.

Referring to FIG. 1, the storage space of an entire DVD medium (DVD-ROM) is a volume space 100, which includes a volume and file system region 110 having information on the volume and recorded file structure, an image information region 120 for recording image data, an audio region 130 for recording audio data and an other file region 140.

It is possible that data may exist in the image information region 120, and the catalog information related to each item of music may exist in a predetermined area of the audio region 130, and the other file region 140 may or may not exist.

As shown in FIG. 1, the image information region 120 and the audio region 130 may include catalog management (CMG) region 121 and an audio management (AMG) region 131 having management information on the recorded images and audio, respectively, a catalog title set (CTS1) 122 and audio title sets (ATS) 132 to 134, which are files in which the image and audio data are recorded. The CTS1 includes a plurality of program chains (CPGC) 125 to 128. Here, the CPGC indicates a set of related data. The CTS1 file for the catalog may have information on still pictures formed of a plurality of catalogs and sub-pictures, and navigation information for controlling the information on the still pictures and the sub-pictures. As shown in FIG. 1, all image information related to the audio region 130 is stored in the CTS1 122, so that the image information region 120 may include only the CMG 121 and the CTS1 122.

Here, the structure of the information on the still picture and sub-picture, and the navigation, and the rules thereof are shown in the DVD-video specification.

Also, the catalog information can be effectively used by dividing the catalog information into one common catalog CPGC1 125 for the entire audio region and a plurality of title catalogs CPGC2, CPGC3, . . . , CPGCn+1 126, 127, 128 corresponding to each audio title recorded in the audio region 130. That is, a first audio title set (ATS1), i.e., the title catalog related to a first item of music (such as a song) is stored in the CPGC2, and a second title set (ATS2), i.e., the title catalog related to a second item of music is stored in the CPGC3, and thus the nth audio title set (ATSn), i.e., the title catalog related to the nth audio title set (ATSn) is stored in CPGCn+1. The common catalog and each title catalog are formed in a unit of a program chain (CPGC) in the image title.

According to the embodiment of the present invention, the catalog playback information for connecting the CTS and ATS to each other for playback is stored in the AMG region 131 or a predetermined region (information region) of the audio file. The AMG region 131 has a space for recording information on the entire audio region and each title, and a location of the catalog information may be additionally recorded on the AMG region 131.

In the embodiment of the present invention, the catalog playback information which is stored in the AMG region or the audio file region, may be stored in any location. Also, when the disk begins to be read, an appropriate means distinguishes whether or not the catalog playback information exists. The means may define the file names, a region of a disk predetermined by a physical or logical address designated as a space for storing catalog playback information, or information indicating whether existence of a file in which the catalog playback information is stored or not and a location of the file in the data region to be necessarily read such as a volume information region when the disk is read.

The catalog playback information may include the location of the image information in which the catalog is recorded, a file identifier (ID) and an auto presentation information table in which is stored the location of the catalog to be played back corresponding to the predetermined time according to real-time playback information of the audio obtained by real-time playback of the audio.

In FIG. 2, the file ID can recognize a file in which the catalog playback information is recorded. A catalog CPGC number indicates the number corresponding to a common catalog and a title catalog in the image information region in which the catalog is recorded. A catalog pointer indicates the location on the disk of a file or a CPGC in which the catalog is recorded.

Also, each corresponding auto presentation information table has playback time information capable of appropriately and automatically playing back the catalog, using the real-time playback information obtained from the audio data while each recorded title is played back, and information on the playback location of the catalog, so that the auto presentation information table has information on the still picture and the sub-picture to be played back within catalogs when a user has not input commands while one title is played back.

Figure 3:
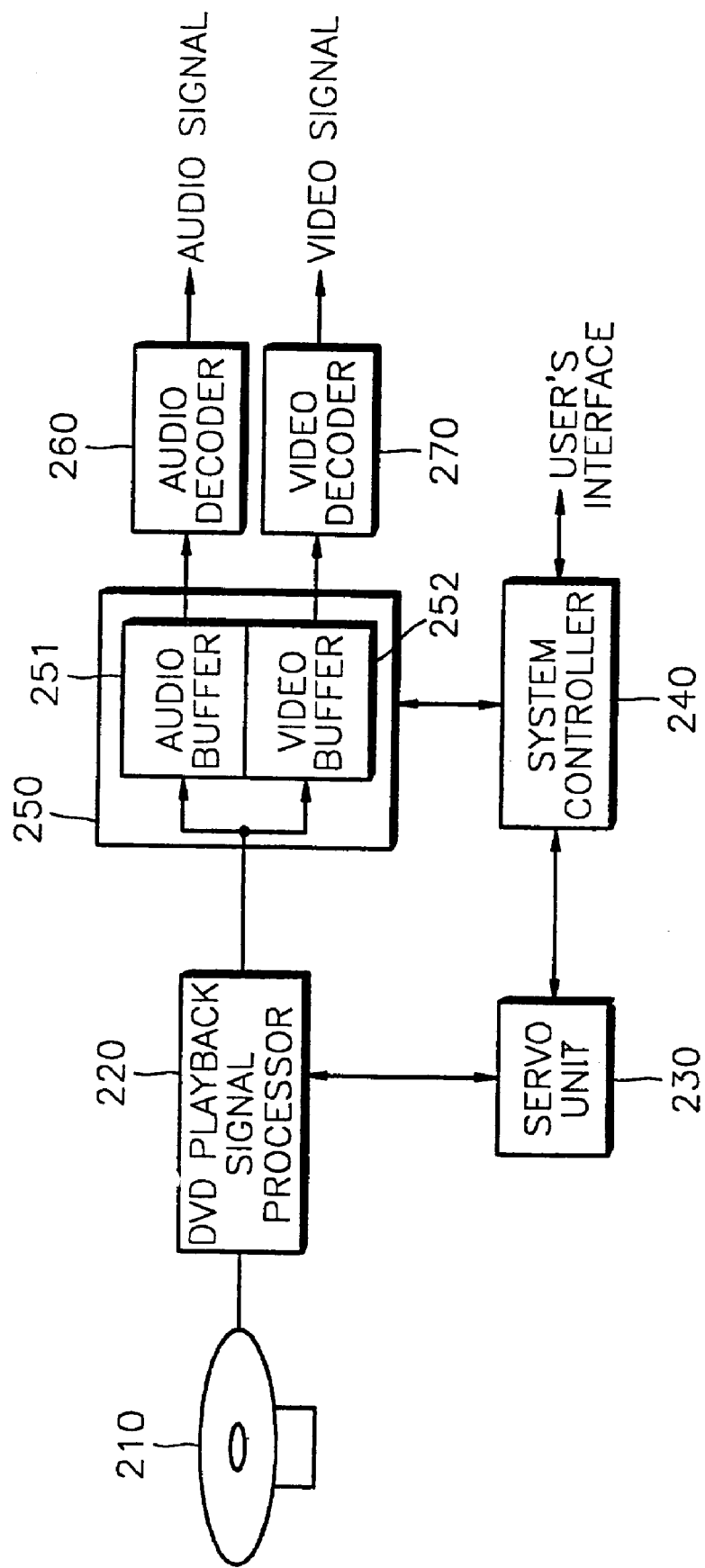
FIG. 3 is a block diagram of a playback apparatus for playing back catalog information according to the present invention.

In FIG. 3, a signal read from an optical disk (DVD-ROM) 210 is demodulated and decoded to a digital signal through a DVD playback signal processing unit 220 according to the physical specification of the DVD-ROM, to provide the restored signal to a buffer memory 250.

The restored digital signal is divided into audio data and video data under the control of a system controller 240 and the audio data of the DVD-Audio specification as an example is written in an audio buffer 251, and video data of the DVD-Video specification as an example, i.e., catalog data is written in a video buffer 252. At this time, the buffer memory 250 can use one memory space or an additional memory.

The catalog data stored in the buffer memory 250 is read in accordance with a control signal generated by the system controller 240 and the read catalog data is restored to an image signal to be output. At this time, the system controller 240 generates an appropriate control signal based on control commands of a user through a remote controller, the auto presentation information table according to catalog playback information, real-time playback information extracted from the audio data, and navigation information of the catalog data, such that the catalog data stored in the video buffer 252 to be played back is output through the video decoder 270 as a video signal.

Meanwhile, the audio data of the DVD-Audio specification read from the audio buffer 251 is provided to the audio decoder 260 and the provided audio data is restored to an audio signal to be output.

Here, the video decoder 270 represents a device restoring image data produced by the DVD-Video specification to an initial image and information added to the image. The apparatus for playing back the DVD-Video has already been produced and such an apparatus is well-known to a person skilled in the art. Also, the audio decoder 260 restores the audio data including the encoded audio data coded by linear pulse coded modulation (linear PCM) or another predetermined manner, management information for managing the audio data and real-time playback information to initial audio and additional information. The system controller 240 and a servo unit 230 control the system to appropriately operate using the control commands from a user and various control signals obtained by playback signals.

Subsequently, a playback operation will be described in view of the video buffer 252 writing and reading catalog data, as shown in FIG. 3.

The playback apparatus shown in FIG. 3 must store information on the common catalog and the title catalog in the video buffer 252, before a predetermined audio title is played back. If not, desired catalog information cannot be played back while the music is played back.

When either the common catalog or the title catalog is selected, the sum of the two items of catalog data should be smaller than the memory capacity of the video buffer 252 for playing back the catalog. Referring to FIG. 1, assuming that the CPGC1 125 is the common catalog for the entire audio region, and the CPGC2 126 is the audio title 1, i.e., the title catalog 1 related to the first item of music, and the CPGC3 127 is the title catalog 2 for the second item of music, and the CPGCn+1 128 is the title catalog n for the nth item of music, the catalog information required for playing back the music has the common catalog information and the title catalog for the music to be played back.

Meanwhile, the amount of buffer memory of the playback apparatus playing back the DVD-Video is approximately 4 MB (megabytes). This functions as a time buffer for resolving an inconsistency between a transmission speed of data read from the disk such as a variable buffer rate and a bit rate of audio played back in real-time or image information.

The conventional buffer must be used to play back audio in real-time, and an additional memory must be used to play back the catalog. Thus, assuming that a memory of 16 MB is the entire buffer memory 250 when one memory is used, the memory size of the video buffer 252 for playing back the catalog is 12 MB. For instance, when the amount of the data of the common catalog is 5 MB, the amount of the title catalog cannot exceed 7 MB.

Also, the title catalog information for each title may not exist. When the sum of the entire catalog data is smaller than the predetermined memory capacity of the video buffer 252, the catalog is not separately classified into the common catalog and the title catalog, and the catalog information on all music can be recorded in the common catalog.

When the optical disk 210 is played back initially, the system controller 240 reads volume information of the optical disk 210, the file system, and information on the CMG and AMG. As described above, the CPGC data in which the catalog information exists is read from the video buffer 252 according to the catalog playback information stored in the AMG region 131 or in a predetermined file. When required catalog data is read, the audio information is read to provide the read audio information to the audio decoder 260 through the audio buffer 251, and the audio information is converted into an audio signal and the converted audio signal is output through the audio decoder 260.

Meanwhile, if a user selects the catalog, i.e., if the user inputs commands for a desired catalog through an input unit such as a remote controller for controlling the playback apparatus, the predetermined catalog data stored in the video buffer 252 corresponding to the input commands are provided to the decoder 270.

If the user does not input commands for playing back the predetermined catalog, i.e., the user does not input the commands for a predetermined time, or the user sets an auto presentation mode, the contents stored in the video buffer 252 are output through the video decoder 270 to output an image of the predetermined catalog using the information in the auto presentation information table.

At this time, the catalog data includes still pictures for the backgrounds and sub-pictures for transferring characters and the still pictures and the sub-pictures are controlled using the navigation information defined by the DVD-Video specification. Thus, compared to the case of using only still pictures, 32 sub-pictures can be selected from the DVD-Video, which supports multiple languages.

Also, if the still picture includes character information, the increase in the resolution of the still picture is required for playing back the character information to distinct pictures, so that the compression ratio cannot be increased, and the background image and the character information are divided, so that the compression ratio for the background is increased, and characters can effectively be coded using a compression method for effectively compressing characters defined by the DVD-Video.

As described above, the catalog function is realized using the DVD-Video specification, to thereby edit the catalog for DVD-Audio using an editing system for the DVD-Video, and the playback apparatus for playing back the catalog of the DVD-Audio also plays back the DVD-Video, to thereby minimize additional circuits.

Also, according to the present invention, the predetermined DVD-Video specification is used, so that the character information of the catalog is not processed as the still picture but as the sub-picture, to thereby enable multiple language display.

Although a preferred embodiment of the present invention have been shown and described, it would be appreciated by those skilled in the art that changes may be made in this embodiment without departing from the principles and spirit of the invention, the scope of which is defined in the claims and their equivalents.

What is claimed is:

1. A storage medium, comprising:
   audio data stored in a first predetermined area of the storage medium with catalog playback information; and
   catalog information related to the audio data and stored in a second predetermined area of the storage medium other than the first predetermined area,
   wherein:
   the catalog information comprises a still picture, a sub-picture, and navigation information controlling the still picture and the sub-picture,
   the second predetermined area comprises a catalog management (CMG) region having management information on the catalog information, and a catalog title set (CTS) in which is recorded at least one title catalog of the catalog information related to each item of the audio data, and
   during reproduction of the audio data, the catalog information is reproduced according to the catalog playback information.

2. The storage medium of claim 1, wherein the catalog information is image information produced according to a DVD-Video specification.

3. The storage medium of claim 1, further comprising:
an audio region in which the audio data is recorded; and
an image information region in which the catalog information is recorded;
wherein the audio region for the audio data comprises:
an audio data recording region in which is recorded the audio data, and
an audio information recording region for the entire audio data and/or audio data in units of distinct items of the audio data, in which is stored the catalog playback information connecting the audio data to the catalog information during playback.

4. The storage medium of claim 3, wherein the catalog playback information comprises information on a location of the image information recording region in which is recorded the catalog information.

5. The storage medium of claim 4, wherein the catalog playback information further comprises:
a file identifier (ID); and
an auto presentation information table determining a location of the catalog information to be played back corresponding to a predetermined time in accordance with real-time playback information of audio obtained from the audio data during real-time playback.

6. The storage medium of claim 1, further comprising:
an audio region in which is stored the audio data; and
an image information region in which is stored the catalog information.

7. The storage medium of claim 6, wherein:
the audio region comprises:
an audio management (AMG) region having management information on the audio data, and
a plurality of audio title sets (ATS) in which the audio data is recorded; and the image information region comprises:
the CMG region having the management information on the catalog information, and
the CTS in which is recorded the at least one title catalog of the catalog information related to each item of the audio data.

8. The storage medium of claim 7, wherein the CTS comprises information on still pictures formed of a plurality of the title catalogs and sub-pictures relating to the audio data, and navigation information for controlling the information on the still pictures and the sub-pictures.

9. The storage medium of claim 7, wherein the AMG region comprises the catalog playback information to connect the audio data and the catalog information during playback.

10. The storage medium of claim 2, further comprising:
an audio region in which the audio data is stored; and
an image information region in which the catalog information is stored.

11. The storage medium of claim 6, wherein:
the audio region comprises
an audio management (AMG) region having management information on the audio data, and
a plurality of audio title sets (ATS) in which the audio data is recorded; and
the image information region comprises
the CMG region having the management information on the catalog information, and
the CTS having a plurality of program chains, wherein a first one of the program chains includes catalog information common to each item of the audio data, and remaining ones of the programs chains include the title catalog data having information corresponding to each distinct item of the audio data, respectively.

12. The storage medium of claim 11, wherein the AMG region includes the catalog playback information to connect the audio data and the catalog information during playback.

13. The storage medium of claim 1, wherein the storage medium is a digital versatile disk (DVD).

14. The storage medium of claim 1, further comprising:
an audio region in which is stored the audio data and the catalog playback information in the first predetermined area and the catalog information in the second predetermined area of the audio region; and
an image information region which contains no information.

15. A storage medium, comprising:
an audio area including audio data stored with catalog playback information; and
a still picture information area disposed on the storage medium in an area other than the audio area and including still picture information related to the audio data,
wherein:
the still picture information area comprises:
a still picture,
a sub-picture,
navigation information controlling the still picture and the sub-picture, and
a still picture information region,
the still picture information region includes:
a catalog management (CMG) region comprising a still picture management information area having management information on the still picture information, and
a catalog title set (CTS) comprising a still picture title set in which is recorded at least one still picture title including the still picture information related to each item of the audio data, and
the catalog playback information connects the corresponding still picture information to be reproduced during reproduction of the audio data.

16. A storage medium, comprising:
an audio area including audio data and catalog playback information; and
catalog information related to the audio data and which is stored in a predetermined area of the storage medium other than the audio area,
wherein:
the predetermined area having the catalog information comprises:
a catalog management (CMG) region having management information on the catalog information, and
a catalog title set (CTS) in which is recorded at least one catalog title including the catalog information related to each item of the audio data,
the catalog title comprises:
at least one still picture,
at least one sub-picture, and
navigation information controlling the still picture and the sub-picture, and
the catalog playback information connects the audio data and the catalog information during playback.

* * * * *